(12) United States Patent
Medana

(10) Patent No.: US 8,757,797 B2
(45) Date of Patent: Jun. 24, 2014

(54) ELASTIC CONSTRAINT SYSTEM FOR EYEGLASSES ASSEMBLY AND EYEGLASSES OBTAINED BY SUCH SYSTEM

(76) Inventor: Guido Medana, Valdobbiadene (IT)

( * ) Notice: Subject to any disclaimer, the term of this patent is extended or adjusted under 35 U.S.C. 154(b) by 288 days.

(21) Appl. No.: 13/142,970

(22) PCT Filed: Dec. 28, 2009

(86) PCT No.: PCT/IB2009/055965
§ 371 (c)(1),
(2), (4) Date: Aug. 23, 2011

(87) PCT Pub. No.: WO2010/076758
PCT Pub. Date: Jul. 8, 2010

(65) Prior Publication Data
US 2011/0292334 A1    Dec. 1, 2011

(30) Foreign Application Priority Data

Dec. 30, 2008 (IT) .............................. MI2008A2355

(51) Int. Cl.
*G02C 5/22* (2006.01)
*G02C 1/04* (2006.01)
*G02C 1/08* (2006.01)

(52) U.S. Cl.
CPC ............... *G02C 5/2209* (2013.01); *G02C 1/04* (2013.01); *G02C 1/08* (2013.01)
USPC .............................. 351/153; 351/150; 16/228

(58) Field of Classification Search
CPC ........... G02C 1/08; G02C 1/04; G02C 5/2209
USPC .................... 351/41, 90–109, 111, 113–115, 351/117–119, 121, 140, 142, 149–154; 16/228
See application file for complete search history.

(56) References Cited

U.S. PATENT DOCUMENTS

| 3,627,406 | A | 12/1971 | Blumenthal |
| 3,796,482 | A | 3/1974 | Blumenthal |
| 4,037,946 | A * | 7/1977 | Blumenthal ................. 351/114 |
| 6,015,212 | A * | 1/2000 | Fortini ............................ 351/92 |
| 6,168,341 | B1 | 1/2001 | Chene et al. |
| 6,481,053 | B2 * | 11/2002 | Desbiez-Piat .................. 16/228 |
| 2002/0124350 | A1 | 9/2002 | Desbiez-Piat |

FOREIGN PATENT DOCUMENTS

| EP | 0 838 710 A2 | 4/1998 |
| EP | 1 835 326 A | 9/2007 |
| FR | 1 194 067 A | 11/1959 |
| FR | 1 380 136 A | 11/1964 |
| WO | 97/35085 A1 | 9/1997 |
| WO | 01/04690 A1 | 1/2001 |

OTHER PUBLICATIONS

International Search Report, dated Apr. 8, 2010, from corresponding PCT application.

* cited by examiner

*Primary Examiner* — Huy K Mai
(74) *Attorney, Agent, or Firm* — Young & Thompson

(57) ABSTRACT

An elastic constraint system for a pair of eyeglasses includes at least one inextensible flexible wire provided with two wire terminals to be engaged with two distinct portions of an eyeglasses front frame or temple bars, at least one of the wire terminals being provided with an elastic element mounted preloaded and acting in opposition to a tensioning of the inextensible flexible wire.

20 Claims, 5 Drawing Sheets

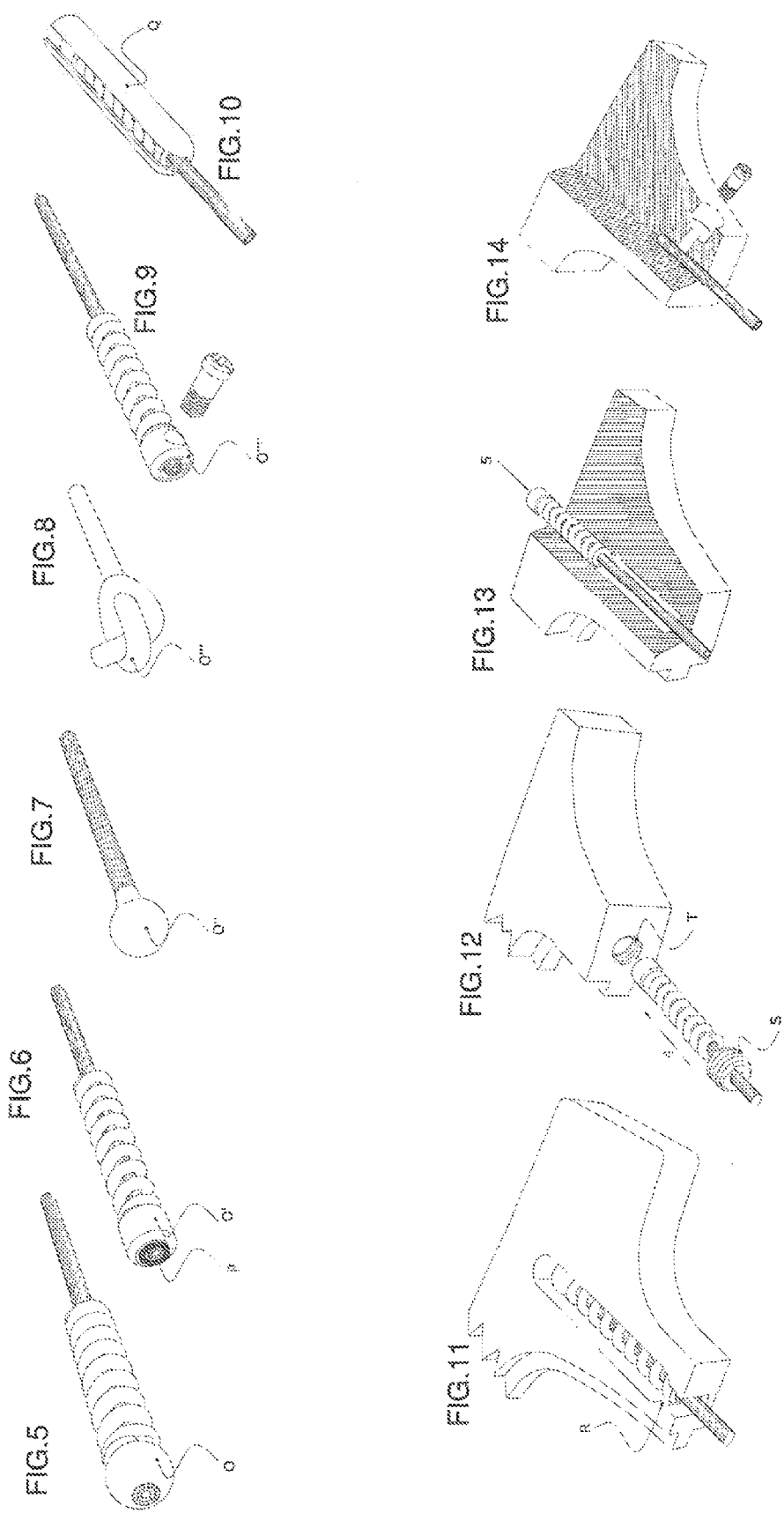

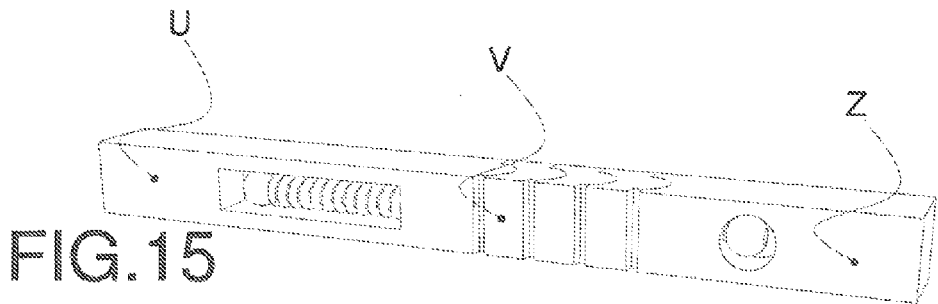
FIG.15
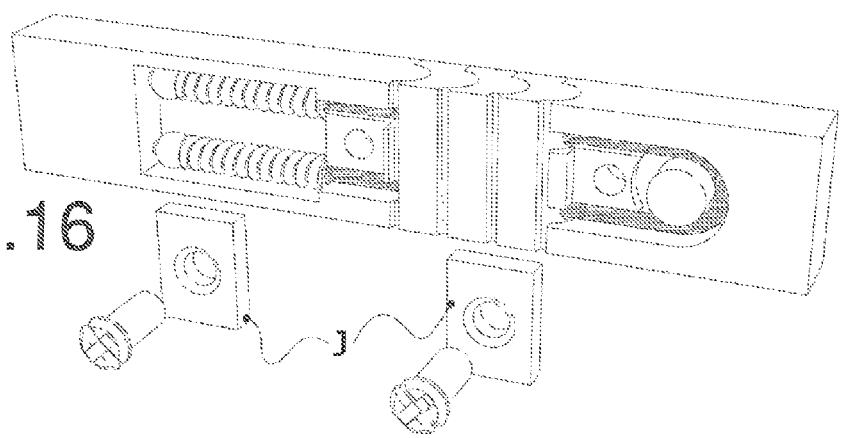
FIG.16
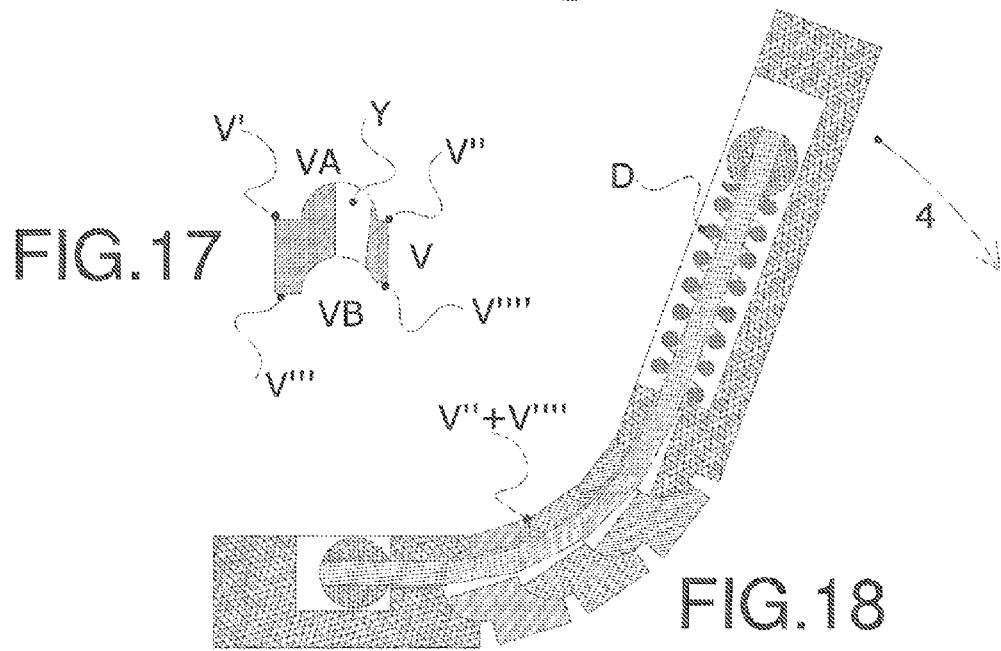
FIG.17
FIG.18

ELASTIC CONSTRAINT SYSTEM FOR EYEGLASSES ASSEMBLY AND EYEGLASSES OBTAINED BY SUCH SYSTEM

BACKGROUND OF THE INVENTION

1. Field of the Invention

The present invention concerns an elastic constraint system for the assembly of a pair of eyeglasses, as well as a pair of eyeglasses specifically conceived to exploit to the best such constraint system for the assembly.

2. Background

As known, in the field of eyeglasses, a number of constraint means have been suggested to assemble together the main bearing structures of eyeglasses, i.e. frame or frontpiece, side temple bars, as well as lenses.

Generally the constraint means for the assembly are shaped as rigid members, mutually joined and hinged by means of screws, joints, or other connecting means which make the assembly of the various components feasible and possibly also introduce elasticity which improve eyeglasses wear and make the use thereof more comfortable. In particular, so-called flexible hinges are known, suited to elastically articulate the temple bars to the front frame. Also, various systems for locking the lenses on the front frame are known, in a way which does not cause excessive stresses on the lens which would otherwise tend to break.

However, prior art systems still suffer from some drawbacks.

On the one hand, as a matter of fact flexible hinges are complex to manufacture and assemble and to join to the temple bars/frontpiece. Moreover, they do not allow a progressive operation, but have only two stable positions (open/close) between which they snap due to elastic means. Moreover, the hinging point is always defined by a fastening pivoting screw, which represents the crucial point of the hinge, prone to becoming loose.

On the other hand, flexible hinges are the prerogative of specialised manufactures, often not coinciding with eyeglasses manufacturers, since manufacturing technology is still very different from the one typically employed to obtain a good frame suited to retain the lenses.

The object of the present invention is hence that of providing an improved constraint system, which is sufficiently economic to manufacture and assemble and which can be used in the articulation of a flexible hinge or, in a variant thereof, for the constraint of the lenses to the front.

A further object is that of providing an enhanced flexible articulation hinge system for connecting the frontpiece to the temple bars of a pair of eyeglasses, which is economic to manufacture and simple to mount. Moreover, it is provided to supply an arrangement which allows to remove the classic hinge screw and hence remove the problems connected with the loosening thereof.

Moreover, it is intended to provide a pair of eyeglasses specifically conceived to exploit to the best such constraint system, in particular in the definition of the hinge system between frame and temple bars, simultaneously producing an innovative way of operation and a corresponding original aesthetic appearance.

SUMMARY OF THE INVENTION

Such objects are achieved through the features mentioned in the attached independent claim. The dependent claims disclose preferred features of the present invention.

In particular, according to the invention an elastic constraint system is provided for a pair of eyeglasses, which comprises at least one inextensible flexible wire provided with two wire terminals which can be engaged with two distinct portions of an eyeglasses frontpiece or temple bars, at least one of the wire terminals being provided with elastic means mounted preloaded and acting against a pulling action on said inextensible flexible wire.

According to a preferred application of the invention, the wire terminals of said wire are intended to couple with an endpiece of the frontpiece and with a temple bar, respectively, and the wire runs through a plurality of mutually coupled vertebrae which act as articulation member.

According to another preferred application of the invention, the wire engages with an edge portion of eyeglasses lenses.

As a matter of fact, according to a main aspect of the invention, an elastic constraint system for a pair of eyeglasses is provided, comprising at least an inextensible flexible wire provided with two wire terminals which can be engaged with an endpiece of the frontpiece and with a temple bar, respectively, at least one of the wire terminals being provided with elastic means mounted preloaded and acting against a tensioning of said inextensible flexible wire, and wherein the wire runs through a plurality of mutually coupled vertebrae.

According to another aspect, the vertebrae are shaped as prismatic bodies provided with a front, convex, semi-cylindrical surface and with a rear, concave, semi-cylindrical surface.

According to a further aspect, on the sides of the semi-cylindrical surfaces of the vertebrae, flat surfaces are provided, at least one whereof, arranged on the side intended to be inside the eyeglasses, is inclined with respect to a longitudinal reference plane running through the centres of said semi-cylindrical surfaces.

According to another aspect, the wire runs through at least one hole or aperture provided in the vertebrae, said hole being off-centre with respect to a longitudinal reference plane running through the centres of said semi-cylindrical surfaces. Preferably such hole or aperture is conical or bevelled.

According to another aspect, the wires are two, running inside said vertebrae one on top of the other in the direction of the hinge axis. According to a variant, these two wires are in a single, U-shaped bent piece and provided with respective wire terminals with elastic means at the two ends.

According to a particular aspect, the two wires run through two distinct holes inside said vertebrae.

According to another preferred aspect, the vertebrae have on one side an open slit, through which the wire or pair of wires can be easily introduced. In such case, preferably the vertebrae have a transversal, C-shaped section.

According to another application of the invention, the wire engages with an edge portion of eyeglasses lenses, wherein a groove is provided which at least partly houses said wire.

BRIEF DESCRIPTION OF THE DRAWINGS

Further features and advantages of the invention are in any case more evident from the following detailed description, given by way of example and shown in the attached drawings, wherein

FIGS. 5-9 are cut-out perspective views of some embodiments of a wire terminal according to the invention;

FIG. 10 is a cut-out perspective view of a stiffening socket for a wire terminal according to the invention;

FIGS. 11-14 are partly-section, cut-out perspective views, which illustrate various coupling modes of a wire terminal in an eyeglasses frontpiece;

FIG. 15 is a cut-out perspective view of a hinge system for temple bars obtained according to an embodiment of the invention;

FIG. 16 is a partly exploded view similar to the one of FIG. 15, of a hinge system obtained according to another embodiment of the invention;

FIG. 17 is a section view of an exemplifying vertebra according to the invention;

FIGS. 18-20 are section views of a hinge for a temple bar according to the invention, in a closed, open and over-open condition, respectively;

DETAILED DESCRIPTION OF SOME PREFERRED EMBODIMENTS

As known, a pair of eyeglasses consists of a front frame or frontpiece 1, whereon a pair of lenses F is set, at the side ends whereof support temple bars U are hinged.

Figure 1:
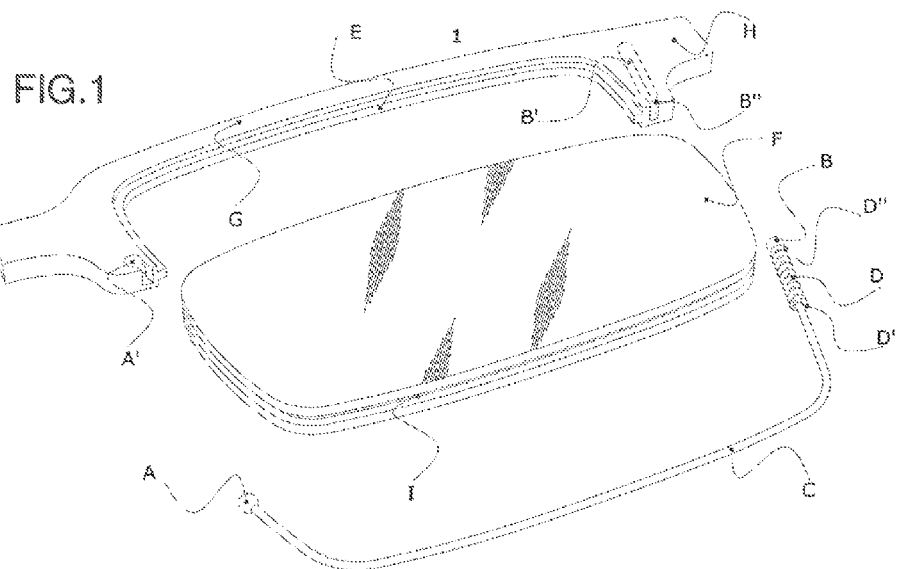
FIG. 1 is a cut-out perspective and exploded view of a frontpiece portion with its lens and the constraint system according to an embodiment of the invention.
Figure 2:
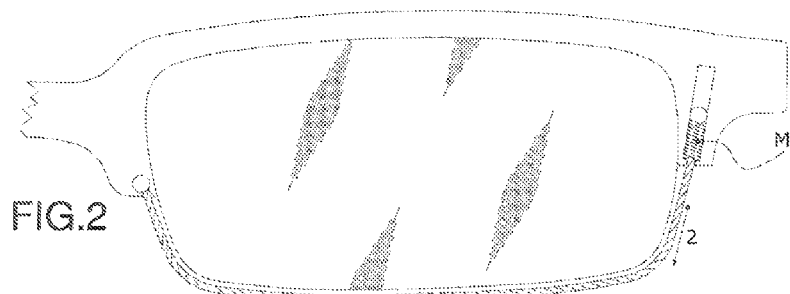
FIG. 2 is an elevation front view of FIG. 1 in a mounting condition.
Figure 3:
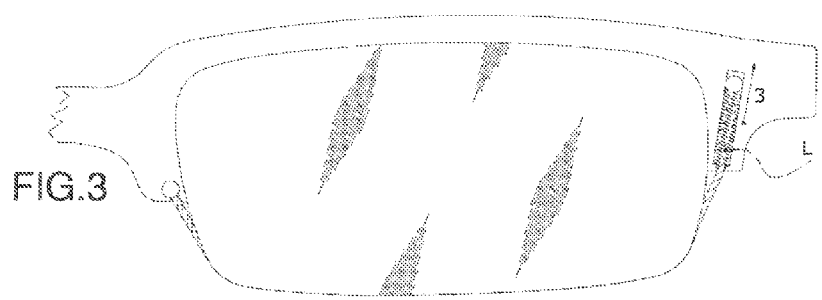
FIG. 3 is a similar view to that of FIG. 2 in a condition of use.

FIGS. 1-3 show only part of the front frame with one of the two lenses, being understood that the other part is fully symmetrical.

Lens F is engaged with a housing portion G of the frontpiece, which retains it in the set position. Housing portion G only partly surrounds the perimeter of the lens and leaves free a significant part thereof, for example at least 30%.

In FIG. 1 such housing portion G is the top one of the frame, but it could be in the same way the lower part.

For greater stability, lens F has a perimetral groove I which couples with a rib E found on housing portion G.

The system is completed by a constraint means consisting of a substantially inextensible wire C, provided with two wire terminals A and B, at least one of which is provided with an elastic opposition member D. Such elastic constraint system is coupled with the part of exposed perimeter of lens F in the way shown in the following.

In the embodiment visible in FIGS. 1-3, wire terminal A is fixed and is engaged with a corresponding seat A' obtained in the frontpiece. The opposite wire terminal B, provided with a helical spring D, is engaged with an opposite seat B' of frontpiece 1. In this case, wire terminal B, instead of abutting directly with the seat B' of the frontpiece (as occurs instead between fixed wire terminal A and own seat A'), rests on an end D" of spring D, the opposite end D' of which abuts with a bottom B'' of seat B'. Thereby inextensible wire C can slide within spring D bringing wire terminal B against spring D, which is thus compressed.

With reference to FIG. 1, it should be noticed that with the spring entirely compressed (M), wire C remains loose around lens F, which can thus be easily removed or inserted to couple with the rib E of the frontpiece. In order to bring spring D to close packwise, it is of course necessary to impart a traction force, shown by 2 in FIG. 2, to overcome the elastic reaction of spring D (of the order, for example, of 1-2 Kg).

By releasing wire, the elastic reaction—shown by 3 in FIG. 3—tends to extend again the spring (L) and consequently to recall the wire which abuts against the lower edge of lens F, pushing it against portion G. Preferably, wire C has a diameter suitable to be inserted in the perimetral groove I of the lens, so as not to be able to escape sideways once it is placed under tension close to the lens edge.

The wire length is hence calibrated so as to allow the introduction/exit of the lens when the spring is completely compressed (M) in its seat B'.

The wire can be made of various materials, provided they are sufficiently inextensible to avoid loosening of the system which would end up allowing the accidental exit of the lens from the engagement with the frame or other malfunctioning occurrences. Wire C can hence be a metal wire strand, but also a Nylon™ thread or other synthetic material of a suitable diameter.

Figure 4:
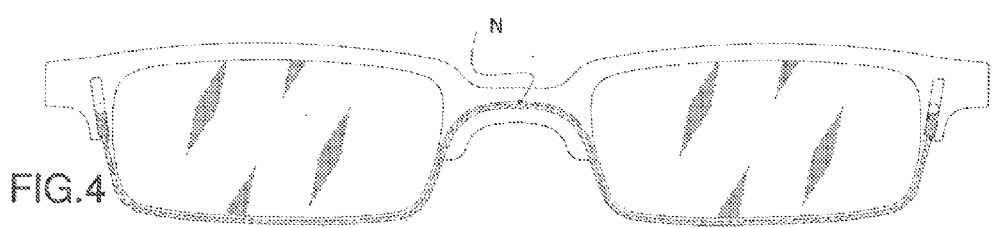
FIG. 4 is an elevation front view of an eyeglasses frame according to a variant of the system of FIG. 1.

FIG. 4 shows a variant, wherein the two wire terminals are both provided with elastic means and are coupled with respective grooves at the two ends of the frame. In this case, the constraint system is one for both lenses and wire C runs freely through a groove N inside the nose pad frame.

FIGS. 5-9 show various ways to configure and arrange a wire terminal for wire C.

FIG. 5 provides a crimped (plastic or coining deformation) metal bush at the wire end.

FIG. 6 provides instead a bush O' welded or glued by a cord P to the end of wire C.

In FIG. 7 the head of the wire terminal is obtained as a droplet O" of molten material; the material can be weld material, or it is the same material of the wire (for example when it is made of synthetic plastic material) which is locally melted and shaped as a drop.

In FIG. 8 it is provided to perform a terminal knot O''' at the end of the wire.

FIG. 9 shows instead the construction of the head of the wire terminal by means of a terminal clamp O'''' provided with a transversal screw which grips the wire.

FIGS. 11-13 show instead some different ways of engaging the wire terminal with the elastic means on the frame of the eyeglasses.

FIG. 11 shows that the frame has an elongated groove, within which the entire spring is housed in its extended condition beyond the head of the wire terminal. The entrance part of the groove, through which the wire comes out, has a narrowing (B'' in FIG. 1) sufficient to let the wire through but suitable to make up an abutment surface for the outermost or distal end D' of the spring. Thereby, the spring is prevented from moving in the wire traction direction: said traction hence translates into a displacement of the head of the wire terminal, which acts on the innermost or proximal end D'' of spring D and hence brings it into compression, producing a desired elastic reaction which counters wire traction. In the groove a step R is further provided, arranged to partly choke also the transversal opening of the groove in the proximity of narrowing B'': this serves to avoid a transversal accidental exit of spring D from its seat, in particular under the compression conditions.

In case the frame material is not particularly strong and is subject to wear—for example because it is made of plastic material—the wire terminal is not housed directly in the groove, but is previously housed in a more rigid case or socket Q, as illustrated in FIG. 10. Socket Q is made of hard materials, such as metal, which are not damaged by chafing due to the displacement of spring D and of the head of the wire terminal.

In the embodiment of FIG. 11, the groove housing the wire terminal and the elastic means is open transversally on one side: the introduction of the wire terminal can hence occur transversally to the extension direction of the wire and of spring D. FIG. 13 shows instead a variant of such seat, wherein the groove is shaped as a through hole in the frame (the side opening is hence technically no longer necessary): in this case the flexible wire with the spring and the corresponding head of the wire terminal are inserted longitudinally, according to direction 5, through the hole opposite the exit opening of the wire. The locking of the wire terminal is effected after the introduction of the wire and of the spring into the frame hole. Also this embodiment can provide the use of stiffening socket Q of FIG. 10.

FIG. 12 shows another embodiment, wherein the seat is obtained as a dead hole T in the frame, the exit opening of which has a threading. In this case, the already assembled wire terminal-wire-spring assembly is introduced longitudinally according to direction 4, and retained there by an externally threaded cap S and introduced freely slidable on the wire.

FIG. 14 shows instead exemplifyingly a way of locking a fixed wire terminal in the frame. The wire is simply introduced into a dead hole of the frame and locked there by a gripping screw screwed in a direction orthogonal to the wire introduction hole.

By such constraint system provided with wire-spring-wire terminal—and all the respective connection variants described above—an original articulated connection between the eyeglasses frame and the temple bars can be accomplished.

FIG. 15 diagrammatically shows an articulation portion according to the invention.

Between a frame projection, also called endpiece Z, and the proximal end of a temple bar U, a plurality of shaped members is arranged, which we shall refer to as vertebrae V. The number of the vertebrae depends on the features of the articulation which one intends to achieve, it being possible that there is only one, but preferably 3-4.

Shaped members V have a specific shape, which is described in the following, and can be made of various materials, among which metal (aluminium, bronze, stainless steel, . . . ), plastic, wood and more.

The wire system with elastic wire terminal is fastened on one side to endpiece Z and on the other side to temple bar U, with the inextensible flexible wire which runs through the different vertebra members V aligned according to the main axis of the temple bar. For greater ease of assembly, as illustrated in FIG. 15, the fixed wire terminal is provided on endpiece Z while elastic wire terminal, with the corresponding spring, is housed in the temple bar.

Vertebrae V are characterised by a particular shape, which allows the coupling thereof in series and determines the operation of the articulated joint. The terminal portions of endpiece Z of the frame and of temple bar U are shaped accordingly to be able to couple with the terminal vertebrae.

As visible in FIG. 17, each vertebra V consists of a prismatic body provided with a front surface VA, characterised by a convex, semicircular (or rather, semi-cylindrical) shape, and by a corresponding concave, semicircular (or rather, semi-cylindrical) rear surface VB. The plane passing through the two centres of the convex surface VA and the concave surface VB makes up a longitudinal reference plane of vertebra V.

The front convex surface is flanked by two flat surfaces V' and V'' which are preferably not mutually parallel: as a matter of fact, flat surface V', intended to lie on the outside of the eyeglasses, is substantially orthogonal to the longitudinal reference plane, while inner flat surface V'' is inclined with respect to the longitudinal reference plane, in particular it defines an angle which opens to the rear direction of vertebra V.

Also rear, concave surface VB is flanked by two flat surfaces, an inward one V''' and an outward one V''''. These two flat surfaces are preferably mutually parallel and orthogonal to the longitudinal reference plane, but advantageously do not lie on the same plane (as can be appreciated in FIG. 17).

Vertebra V is run through by one or more holes Y, depending on how many wires must run through it. In the embodiment of FIG. 15 vertebra V is run through by one hole only, arranged according to the longitudinal direction, i.e. the lying direction of the wire in use; in the embodiment of FIG. 16, each vertebra is run through by two holes (one above the other, in the direction of the articulation axis) or by a single elongated hole according to the height of the vertebrae, to let two wires run one above the other.

In this last case, the through hole takes up the shape of a cut-out, as shown in FIGS. 22A-23B.

In order to obtain an advantageous operation of the joint, according to a preferred embodiment the through holes are off-centre with respect to the longitudinal reference plane, and they are possibly conical or bevelled, more open in the direction of the front side of the vertebra.

Figure 19:
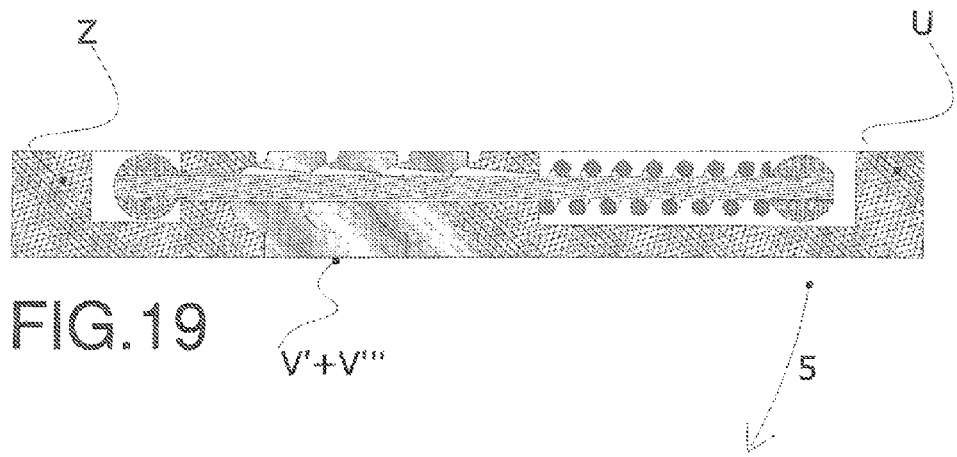

The wire of the constraint system according to the invention is caused to run through the holes of the vertebrae as illustrated in FIG. 19, which represents a rectilinear condition of perfect alignment between endpiece Z, vertebrae V and temple bar U. The individual vertebrae couple with each other, with each concave surface cooperating in a complementary way with the adjacent convex surface. The terminal vertebrae couple similarly with homologous concave or convex surfaces on the end of temple bar U or endpiece Z.

As one can see, the wire runs freely in the lesser-diameter portion of the through-holes, while it runs with a wide play in the bigger-diameter portion of the same holes.

This original configuration of the vertebrae causes the tensioning of the wire by the return spring to produce the mutual rotation of the vertebrae, which slide on their respective semi-cylindrical areas, naturally tending to arrange themselves in the condition of FIG. 18, until inclined flat surfaces V'' abut with orthogonal flat surfaces V'''' of the next vertebra. As a matter of fact, this is a stable attitude, due to the fact that in such condition the wire extends allowing spring D to extend.

The condition illustrated in FIG. 18 coincides with the closed condition of the temple bars.

If one now applies an opening force in the direction of arrow 4 to temple bar U, keeping stationary endpiece Z, the vertebrae-temple bar and spring assembly returns in the extended condition of FIG. 19, until the vertebrae stop abutting with the respective orthogonal flat surfaces V'-V'''.

The wire contracts, due to the straightening of the vertebrae, causing a first compression of spring D.

This balance between the force imparted on the temple bar and the contact between vertebrae V established the opening condition of temple bar U.

Figure 20:
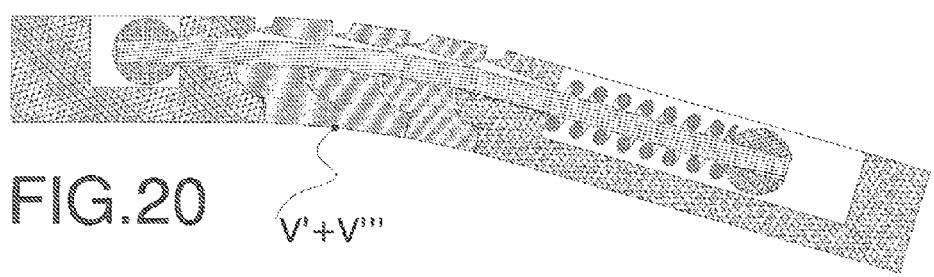

If one now applies a new force 5, greater than the previous one 4, to temple bar U, keeping endpiece Z stationary, the vertebrae-temple bar and spring assembly moves into the over-opening condition of FIG. 20. By the application of this force 5 a further compression of the spring is caused and the vertebrae are induced to overcome the equilibrium position of FIG. 19 and to mutually abut against a corner of flat surfaces V' and V'''.

Keeping force 5, the overopening is limited by the coils of spring D colliding with each other (so-called condition of "pack-like" compressed spring).

Releasing force 5, the spring tends to extend bringing the vertebrae-temple bar and spring assembly into the closed condition of FIG. 18.

In FIG. 16 a further embodiment is shown wherein the endpiece-vertebrae-temple bar and spring assembly comprises a single U-shaped bent wire about a constraint pin on endpiece Z and constrained at the two ends by two elastic wire terminals with two springs. The two wire portions run in the joint one above the other, with reference to the orientation in which eyeglasses are normally worn. In other words, the wires lie one above the other along the hinge axis of the joint according to the invention.

In the version illustrated here it is further provided to ease the mounting and dismounting, providing for the housing seats in the endpiece and in the temple bar are transversally open, so as to be able to introduce the wire terminals of the constraint system in the way shown with reference to FIG. 11. At the end of the assembly it is furthermore provided that the wires are prevented to accidentally come off by means of two plates or small covers 3, screwed on endpiece Z and on temple bar U, respectively.

Figure 21A:
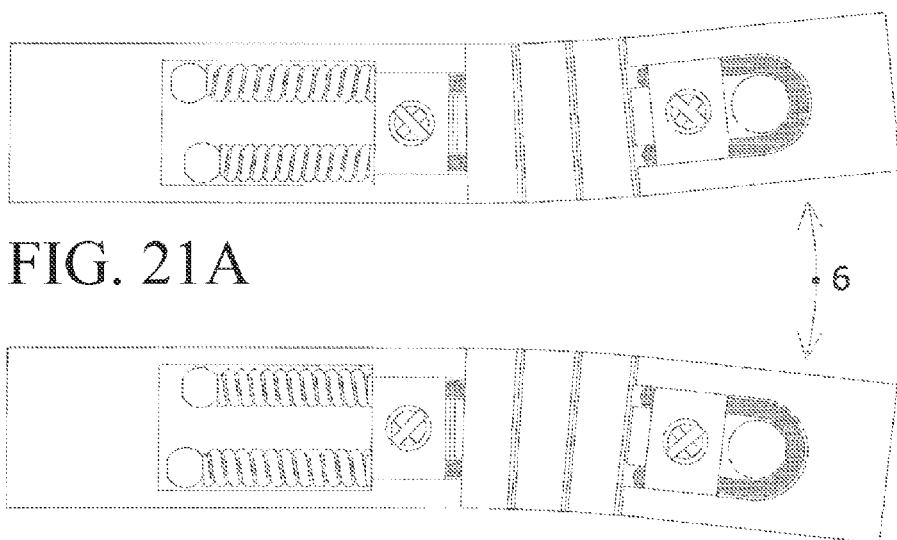
FIGS. 21A and 21B are elevation side views similar to FIG. 16 in transversal bending conditions.
Figure 21B:
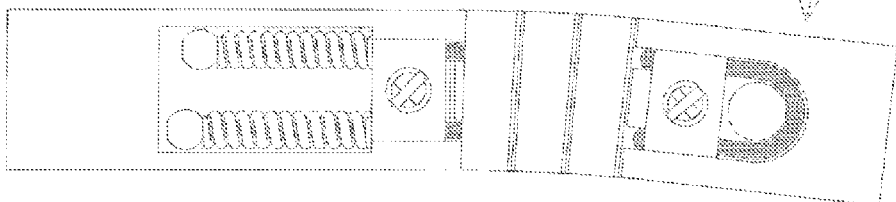
Figure 22A:
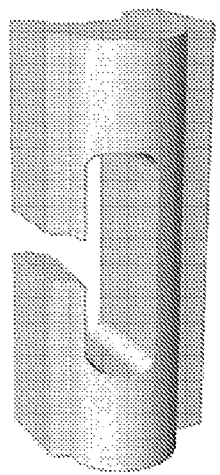
FIGS. 22A and 22B are perspective views of a particular embodiment of a vertebra according to the invention.
Figure 22B:
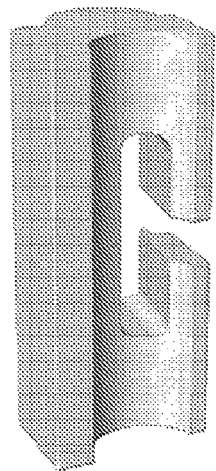

FIGS. 21A and 21B illustrate an advantageous result which can be achieved by this embodiment employing two springs on the same U-shaped bent wire. By applying a transversal force 6 to the temple bar, the vertebrae are capable of opening towards each other, abutting against each other along their respective edges, placing in greater traction one of the two wires over the other. In substance, subject to a transversal stress (typical situation which can be found in case of accidental impacts), the temple bar according to this embodiment is capable of elastically yielding without undergoing damage. It must nevertheless be stressed that a similar effect is obtained even only with a single wire, due to its intrinsic flexibility in all directions.

In FIGS. 22A-23B, as already mentioned, alternative embodiments of the vertebrae are shown, which can be employed preferably in the case of a double wire. On the side of each vertebra an open slit can be defined, through which it is easy to insert the wire of the elastic constraint system.

Figure 23A:
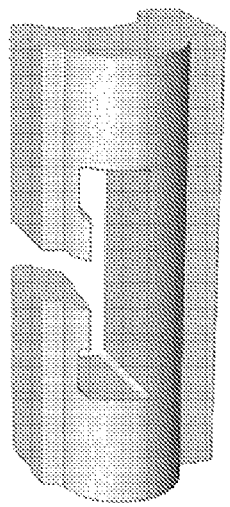
FIGS. 23A and 23B are perspective views of another particular embodiment of vertebrae according to the invention.
Figure 23B:
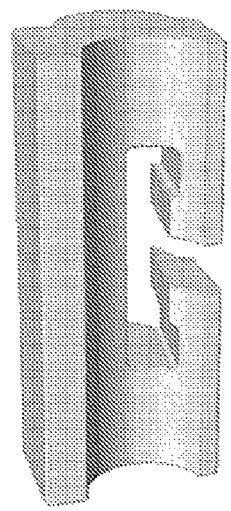

Moreover, in FIGS. 23A and 23B, the edge shape of the laterally open slit provides inward protrusions. This shape guarantees a better confinement of the pair of wires in the respective seats inside the vertebrae, in particular one located upwards and the other one located downwards.

As can be guessed, due to the teachings supplied here, it is possible to perfectly achieve the objects set forth in the preamble, in addition to a series of further advantages.

When applied to the spectacles frame, the elastic constraint system of the invention allows the easy assembly of the lenses without the help of tools and also in the presence of non-negligible dimensional errors: as a matter of fact, the elastic recovery of the spring, allows to use the constraint system of the invention even in the presence of perimetral variations of the lenses. This solution also allows to lighten the eyeglasses frame, removing for example the entire part thereof lying below the lens. In the case in which the inextensible wire consists of a strand of metal wires, it is possible to obtain colour schemes matching the frame colour (galvanic process), impossible to achieve with alternative solutions which exploit only elastic extensibility feature of a perimetral thread to obtain a similar lens-retaining effect.

The system of the invention further allows to use very different materials to manufacture the other frame portion: plastics, metal, wood, carbon and more, so as to be able to characterise the product more freely.

In the application thereof to the temple bar joint system, the invention produces a very soft and progressive operation. The removal of any structural play between bar and frame is obtained, because a constant tensioning between the components coupled through circular-surface seats is determined (self-stabilisation). The joint thus accomplished does not require the presence of the traditional pivoting screw and hence greatly reduces any need for maintenance. Due to its elastic yielding according to the articulation axis, it produces an intrinsic general sturdiness even against accidental impacts or improper uses. Finally, the series of vertebrae which can be manufactured in a number of materials opens new development horizons on the matching of colours and/or so-far unexplored materials.

However, it is understood that the invention is not limited to the particular configurations illustrated above, which represent only non-limiting examples of the scope of the invention, but that a number of variants are possible, all within the reach of a person skilled in the field, without departing from the scope of the invention.

The invention claimed is:

1. Elastic constraint system for a pair of eyeglasses, comprising:
    at least one inextensible flexible wire provided with two wire terminals to be engaged with two distinct portions of an eyeglasses front frame or temple bars,
    at least one of the wire terminals being provided with elastic means mounted preloaded and acting in opposition to a tensioning of said inextensible flexible wire,
    wherein the wire terminals of said wire couple with a front frame endpiece portion and with a temple bar, respectively, and
    a plurality of mutually coupled vertebrae, each vertebrae having a front surface (VA) and a rear surface (VB), a plane passing through respective centers of the front surface (VA) and the rear surface (VB) defining a longitudinal reference plane of each vertebra,
    each vertebra further comprising at least one hole or aperture extending between the front surface (VA) to the rear surface (VB) and located off-center with respect to the longitudinal reference plane,
    wherein the wire runs through the plurality of mutually coupled vertebrae via the at least one hole or aperture from the front surface (VA) to the rear surface (VB) with the wire located off-center with respect to the longitudinal reference plane.

2. Constraint system as in claim 1, wherein said vertebrae are shaped as prismatic bodies provided with the front surface being a front, convex, semi-cylindrical surface and with the rear surface being a rear, concave, semi-cylindrical surface.

3. Constraint system as in claim 2, wherein on the sides of said semi-cylindrical surfaces flat surfaces are provided.

4. Constraint system as in claim 3, wherein at least one of said flat surfaces, arranged on the side intended to be found inside the eyeglasses, is inclined with respect to a longitudinal reference plane passing through the centres of said semi-cylindrical surfaces.

5. Constraint system as in claim 4, wherein said wire runs through at least one hole or aperture provided in said vertebrae, said hole being off-centre with respect to a longitudinal reference plane running through the centres of said semi-cylindrical surfaces.

6. Constraint system as in claim 4, wherein said wires are two, running inside said vertebrae one above the other in a longitudinal direction through the hinge along an articulation axis.

7. Constraint system as in claim 3, wherein said wire runs through at least one hole or aperture provided in said vertebrae, said hole being off-centre with respect to a longitudinal reference plane running through the centres of said semi-cylindrical surfaces.

8. Constraint system as in claim 3, wherein said wires are two, running inside said vertebrae one above the other in a longitudinal direction through the hinge along an articulation axis.

9. Constraint system as in claim 2, wherein said wire runs through at least one hole or aperture provided in said vertebrae, said hole being off-centre with respect to a longitudinal reference plane running through the centres of said semi-cylindrical surfaces.

10. Constraint system as in claim 2, wherein said wires are two, running inside said vertebrae one above the other in a longitudinal direction through the hinge along an articulation axis.

11. Constraint system as in claim 1, wherein said hole or aperture is conical or bevelled.

12. Constraint system as in claim 1, wherein said wires are two, running inside said vertebrae one above the other in a longitudinal direction through the hinge along an articulation axis.

13. Constraint system as in claim 12, wherein said two wires are made of a single, U-shaped bent piece and provided with respective wire terminals with elastic means at the two ends thereof.

14. Constraint system as in claim 12, wherein the two wires run through two distinct holes inside said vertebrae.

15. Constraint system as in claim 1, wherein said vertebrae have on one side an open slit, through which said wire can be introduced.

16. Constraint system as in claim 15, wherein said vertebrae have a C-shaped transversal section.

17. Constraint system as in claim 1, wherein said wire engages with an edge portion of eyeglasses lenses wherein a groove is provided wherein said wire can be at least partly housed.

18. Elastic constraint system for a pair of eyeglasses, characterised in that it comprises at least one inextensible flexible wire provided with two wire terminals to be engaged with two distinct portions of an eyeglasses front frame or temple bars, at least one of the wire terminals being provided with elastic means mounted preloaded and acting in opposition to a tensioning of said inextensible flexible wire, wherein the wire terminals of said wire couple with a front frame endpiece portion and with a temple bar, respectively, and wherein the wire runs through a plurality of mutually coupled vertebrae, and wherein said wires are two, running inside said vertebrae one above the other in a longitudinal direction through the hinge along an articulation axis.

19. Constraint system as in claim 18, wherein said two wires are made of a single, U-shaped bent piece and provided with respective wire terminals with elastic means at the two ends thereof.

20. Constraint system as in claim 18, wherein the two wires run through two distinct holes inside said vertebrae.

* * * * *